(12) United States Patent
Peng et al.

(10) Patent No.: US 8,456,749 B2
(45) Date of Patent: Jun. 4, 2013

(54) ZOOM LENS AND IMAGING DEVICE USING SAME

(75) Inventors: Fang-Ying Peng, New Taipei (TW);
Hai-Jo Huang, New Taipei (TW);
Sheng-An Wang, New Taipei (TW);
Xiao-Na Liu, Guangdong (CN); An-Tze Lee, New Taipei (TW)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/300,670

(22) Filed: Nov. 21, 2011

(65) Prior Publication Data

US 2013/0088787 A1   Apr. 11, 2013

(30) Foreign Application Priority Data

Oct. 6, 2011   (CN) .......................... 2011 1 0292880

(51) Int. Cl.
*G02B 15/14*   (2006.01)
(52) U.S. Cl.
USPC ........... 359/687; 359/683; 359/684; 359/685; 359/686; 359/740; 359/771; 359/774

(58) Field of Classification Search
USPC .......................... 359/683–687, 740, 771, 774
See application file for complete search history.

(56) References Cited

U.S. PATENT DOCUMENTS

| | | | | |
|---|---|---|---|---|
| 2009/0231710 | A1* | 9/2009 | Saruwatari | 359/557 |
| 2010/0238564 | A1* | 9/2010 | Kubota et al. | 359/687 |
| 2011/0102908 | A1* | 5/2011 | Murayama | 359/687 |
| 2011/0116173 | A1* | 5/2011 | Itoh | 359/687 |
| 2011/0164168 | A1* | 7/2011 | Yoshitsugu | 359/687 |
| 2011/0170203 | A1* | 7/2011 | Murayama et al. | 359/687 |
| 2011/0194017 | A1* | 8/2011 | Yoshitsugu | 348/345 |
| 2011/0222169 | A1* | 9/2011 | Sudoh | 359/687 |
| 2011/0228408 | A1* | 9/2011 | Sudoh | 359/687 |

* cited by examiner

*Primary Examiner* — Evelyn A. Lester
(74) *Attorney, Agent, or Firm* — Altis Law Group, Inc.

(57) ABSTRACT

Provided is a zoom lens for imaging an object on an imaging surface. The zoom lens includes, in the order from an object side to an image side thereof, a first lens group with positive refraction power, a second lens group with negative refraction power, a third lens group with positive refraction power, and a fourth lens group with positive refraction power. The first lens group includes a first surface. The zoom lens satisfies the formula: $0.15<|L3|/Lt<0.25$, where L3 is a distance of the movement of the third lens group along an optical axis of the zoom lens when the zoom lens is switched between a wide-angle state and a telephoto state, and Lt is a distance from the first surface to the imaging surface.

20 Claims, 16 Drawing Sheets

ZOOM LENS AND IMAGING DEVICE USING SAME

BACKGROUND

1. Technical Field

The present disclosure relates to a zoom lens and an imaging device using the zoom lens.

2. Description of Related Art

Nowadays, the demand for imaging devices, such as digital cameras, digital video cameras, and monitoring devices, to not only be smaller but also have excellent zoom ratio and imaging capabilities grows.

However, if the size of an imaging device is reduced, the zoom ratio and imaging capabilities of the imaging device may suffer, because the usual way to improve the zoom ratio and imaging capabilities of a lens system is to increase the total length and/or volume of the lens system of the imaging device. Therefore, it is difficult to obtain an imaging device having an excellent zoom ratio and imaging capabilities while at the same time making it smaller.

Therefore, it is desirable to provide a zoom lens and an imaging device which can overcome the limitations described above.

DETAILED DESCRIPTION

Embodiments of the disclosure will now be described in detail with reference to the accompanying drawings.

Figure 1:
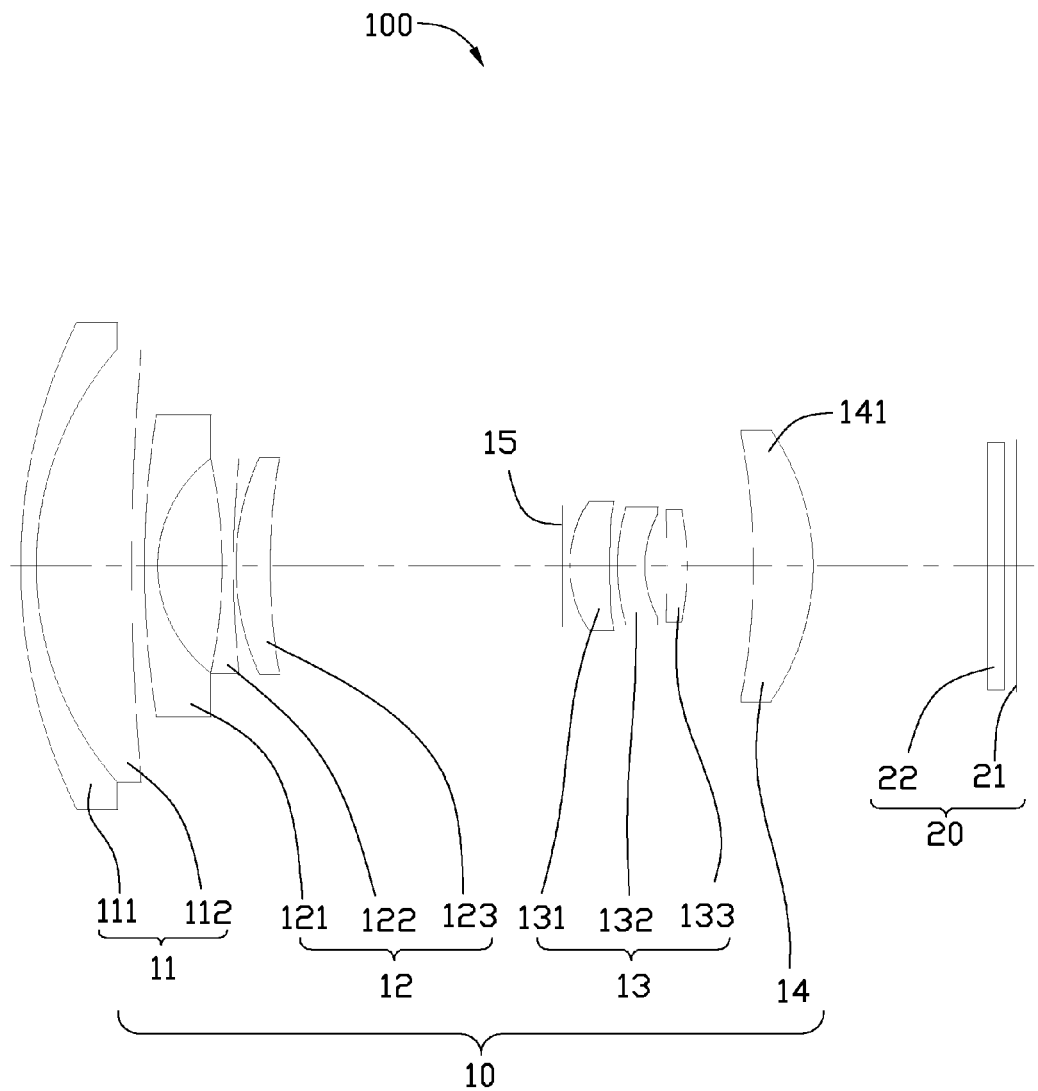
FIG. 1 is a schematic view of an imaging device at a wide-angle state in accordance with a first exemplary embodiment.
Figure 2:
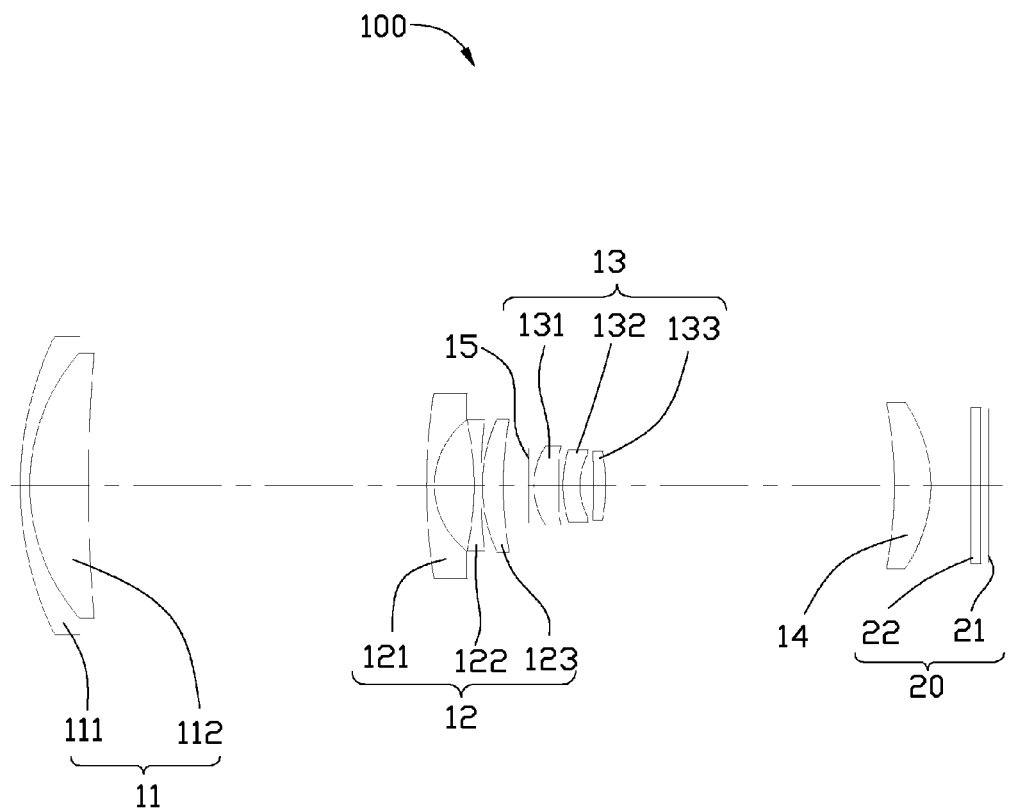
FIG. 2 is a schematic view of the imaging device of FIG. 1 at a telephoto state.

Referring to FIG. 1 and FIG. 2, an imaging device 100, according to a first exemplary embodiment, includes a zoom lens 10, and an image sensor 20 aligned with an optical axis of the zoom lens 10.

The zoom lens 10 includes, in the order from the object side to the image side thereof, a first lens group 11 with positive refraction power, a second lens group 12 with negative refraction power, a third lens group 13 with positive refraction power, and a fourth lens group 14 with positive refraction power. The zoom lens 10 further includes an aperture 15 positioned between the second lens group 12 and the third lens group 13. During focusing, the first lens group 11, the second lens group 12, the third lens group 13 and the fourth lens group 14 are moved along the optical axis of the zoom lens 10. In addition, the fourth lens group 14 is also configured to compensate for image offset caused by focusing and/or changing of object distance. When in a wide-angle state, the zoom lens 10 has a minimal effective focal length, and when in a telephoto state, the lens 10 has a maximum effective focal length.

The first lens group 11 includes, in the order from the object side to the image side of the zoom lens 10, a first lens 111 with negative refraction power and a second lens 112 with positive refraction power. The first lens 111 and the second lens 112 are spherical lenses, and are combined using glue. The first lens 111 is meniscus shaped and includes a convex first surface facing the object side and a concave second surface facing the image side. The second lens 112 is meniscus shaped and includes a convex third surface facing the object side, and a concave fourth surface facing the image side.

The second lens group 12 includes, in the order from the object side to the image side of the zoom lens 10, a third lens 121 with negative refraction power, a fourth lens 122 with negative refraction power, and a fifth lens 123 with positive refraction power. The third lens 121, the fourth lens 122, and the fifth lens 123 are spherical lenses. The third lens 121 is meniscus shaped and includes a convex fifth surface facing the object side, and a concave sixth surface facing the image side. The fourth lens 122 is biconcave shaped and includes a concave seventh surface facing the object side, and a concave eighth surface facing the image side. The fifth lens 123 includes a convex ninth surface facing the object side, and a concave tenth surface facing the image side.

The third lens group 13 includes, in the order from the object side to the image side of the zoom lens 10, a sixth lens 131 with positive refraction power, a seventh lens 132 with negative refraction power, an eighth lens 133 with positive refraction power. The sixth lens 131 is an aspheric lens, and the seventh lens 132 and the eighth lens 133 are spherical lenses. The sixth lens 131 includes a convex eleventh surface facing the object side and a concave twelfth surface facing the image side. The seventh lens 132 includes a convex thirteenth surface facing the object side and a concave fourteenth surface facing the image side. The eighth lens 133 includes a concave fifteenth surface facing the object side and a convex sixteenth surface facing the image side.

The fourth lens group 14 includes a ninth lens 141 with positive refraction power. The ninth lens 141 is spherical lens. The ninth lens 141 includes a concave seventeenth surface facing the object side and a convex eighteenth surface facing the image side.

The image sensor 20 includes an imaging surface 21 and a filter 22 at the object side of the imaging surface 21. The filter 22 is configured for filtering incident light of a predetermined wavelength.

The zoom lens 10 satisfies the formulas:

$$0.15 < |L3|/Lt < 0.25; \qquad (1)$$

wherein L3 is a distance of the movement of the third lens group 13 along the optical axis when the zoom lens is switched between the wide-angle state and the telephoto state, and Lt is a distance from the first surface to a surface which images are formed on (the imaging surface 21 of the image sensor 20), along the optical axis. In this embodiment, the L3 is positive when the third lens group 13 moves from the object side to the image side, and the L3 is negative when the third lens 12 moves from the image side to the object side.

Formula (1) is for balancing the total length of the zoom lens 10 and the imaging capability of the zoom lens 10.

Therefore, the zoom lens 10 has an excellent imaging capability and a compact size at the same time.

The zoom lens 10 further satisfies the formula:

$$0.045 < f3/(ft \times fw) < 0.055; \quad (2)$$

wherein f3 is an effective focal length of the third lens group 13, ft is an effective focal length of the zoom lens 10 at the telephoto state, and fw is an effective focal length of the zoom lens 10 at the wide-angle state.

Formula (2) is for keeping a large zoom ratio and a super wide-angle of visual field of the zoom lens 10. In addition, formula (2) correct for spherical aberration of the zoom lens 10.

Furthermore, the zoom lens 10 can optically compensate for image offset caused by shaking of the imaging device 100 when handheld. The zoom lens 10 compensates by moving the third lens group 13. The zoom lens 10 further satisfies the formula:

$$0.15 < f3/ft < 0.25. \quad (3)$$

Formula (3) allows image offset with only a short distance of movement of the third lens group 13, therefore, enhancing response speed of image offset by the zoom lens 10.

The zoom lens 10 further satisfies the formula:

$$55 < |V7-V8| < 70; \quad (4)$$

Wherein V7 is the Abbe number of the seventh lens 132, and V8 is the Abbe number of the eighth lens 133.

Formula (4) provides a large zooming ratio with excellent imaging capability to the zoom lens 10.

In the first embodiment, the zoom lens 10 satisfies the parameters of Tables 1-3. Listed below are the symbols used in Tables 1-3:

R: radius of curvature,
D: distance between surfaces on the optical axis,
Nd: refractive index,
Vd: Abbe number,
f: effective focal length of the zoom lens 10,
D4: distance between the fourth surface and the fifth surface on the optical axis,
D10: distance between the tenth surface and the eleventh surface on the optical axis,
D16: distance between the sixteenth surface and the seventeenth surface on the optical axis, and
D18: distance between the eighteenth surface and an object side surface of the filter on the optical axis.

TABLE 1

| surface | type | R (mm) | D (mm) | Nd | Vd |
|---|---|---|---|---|---|
| first surface | spherical | 17.22021 | 0.48 | 2.001003 | 29.134715 |
| second/third surface | spherical | 10.21879 | 2.955 | 1.804200 | 46.502535 |
| fourth surface | spherical | 73.91341 | D4 | — | — |
| fifth surface | spherical | 30.21305 | 0.4 | 1.883000 | 40.805404 |
| sixth surface | spherical | 4.154824 | 2 | — | — |
| seventh surface | spherical | −15.62686 | 0.35 | 1.729160 | 54.673513 |
| eighth surface | spherical | 31.40399 | 0.075 | — | — |
| ninth surface | spherical | 8.063187 | 1.062 | 2.002723 | 19.317191 |
| tenth surface | spherical | 19.60882 | D10 | — | — |
| aperture | — | infinity | 0.25 | — | — |
| eleventh surface | aspherical | 3.904443 | 1.242 | 1.693500 | 53.200779 |
| twelfth surface | aspherical | 103.9837 | 0.232 | — | — |
| thirteenth surface | spherical | 6.443325 | 0.845 | 1.922860 | 18.896912 |

TABLE 1-continued

| surface | type | R (mm) | D (mm) | Nd | Vd |
|---|---|---|---|---|---|
| fourteenth surface | spherical | 3.393499 | 0.69 | — | — |
| fifteenth surface | spherical | −33.9678 | 0.62 | 1.496997 | 81.608379 |
| sixteenth surface | spherical | −8.734793 | D16 | — | — |
| seventeenth surface | spherical | −22.28714 | 1.85 | 1.496997 | 81.608379 |
| eighteenth surface | spherical | −7.454892 | D18 | — | — |
| filter | flat | infinity | 0.8 | 1.516 | 64.1 |
| imaging surface | flat | infinity | — | — | — |

TABLE 2

| state | F | D4 | D10 | D16 | D18 |
|---|---|---|---|---|---|
| wide-angle state | 4.586 | 0.4 | 9.033 | 2.05 | 4.995 |
| middle state | 18.32 | 11.257 | 3.322 | 12.681 | 2 |
| telephoto state | 34.939 | 17.106 | 1.297 | 14.596 | 1.61 |

TABLE 3

| aspherical coefficient | eleventh surface | twelfth surface |
|---|---|---|
| k | 0.410787 | 665.2078 |
| A4 | −0.00011593348 | 0.0037053259 |
| A6 | 0.000085725109 | 0.00075722376 |
| A8 | 0.00020739289 | −0.00036146427 |
| A10 | −0.000060320058 | 0.00030799676 |
| A12 | 0.0000048226882 | −0.00010332042 |
| A14 | 0.0000017847423 | 0.000016711619 |
| A16 | −0.00000019630506 | −0.00000068980054 |

The aspherical surfaces are shaped according to the formula:

$$x = \frac{ch^2}{1 + \sqrt{1 - (k+1)c^2 h^2}} + \sum A_i h^i$$

wherein h is a height from the optical axis of the zoom lens 10 to the aspherical surface, c is a vertex curvature, k is a conic constant, and Ai are i-th order correction coefficients of the aspherical surfaces.

In the first embodiment, the zoom lens 10 satisfies the parameters of Table 4. Listed below are the symbols used in Table 4: 2ω: field angle; $F_{No}$: F number.

TABLE 4

| State | $F_{No}$ | 2ω (degree) |
|---|---|---|
| wide-angle state | 2.97 | 89 |
| middle state | 5.0 | 25.3 |
| telephoto | 5.5 | 13.5 |

From Table 1 and Table 2, the parameters for formulas (1)-(4) are listed in Table 5 as below.

TABLE 4

| parameter | L3 | Lt | f3 | ft | fw | V7 | V8 |
|---|---|---|---|---|---|---|---|
| value | −9.16 | 48.97 | 8.04 | 34.94 | 4.59 | 18.9 | 81.6 |

Therefore, the value of |L3|/Lt is about 0.187, the value of f3/(ft×fw) is about 0.05, the value of f3/ft is about 0.3, and the value of V7−V8 is about −62.7.

The zoom lens 10 has a zooming ratio of eight, and was tested using the incident light at wavelengths of 436 nanometers, 486 nanometers, 546 nanometers, 588 nanometers, and 656 nanometers are sampled.

Figure 3:
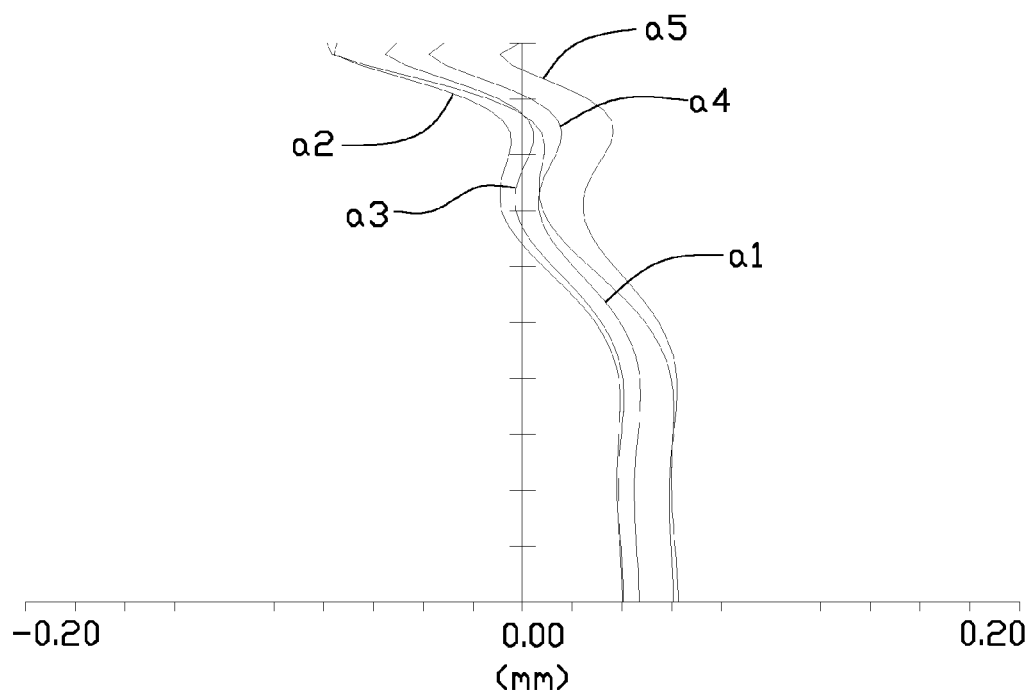
FIGS. 3-5 are graphs respectively showing spherical aberration, field curvature and distortion of the imaging device of FIG. 1.
Figure 4:
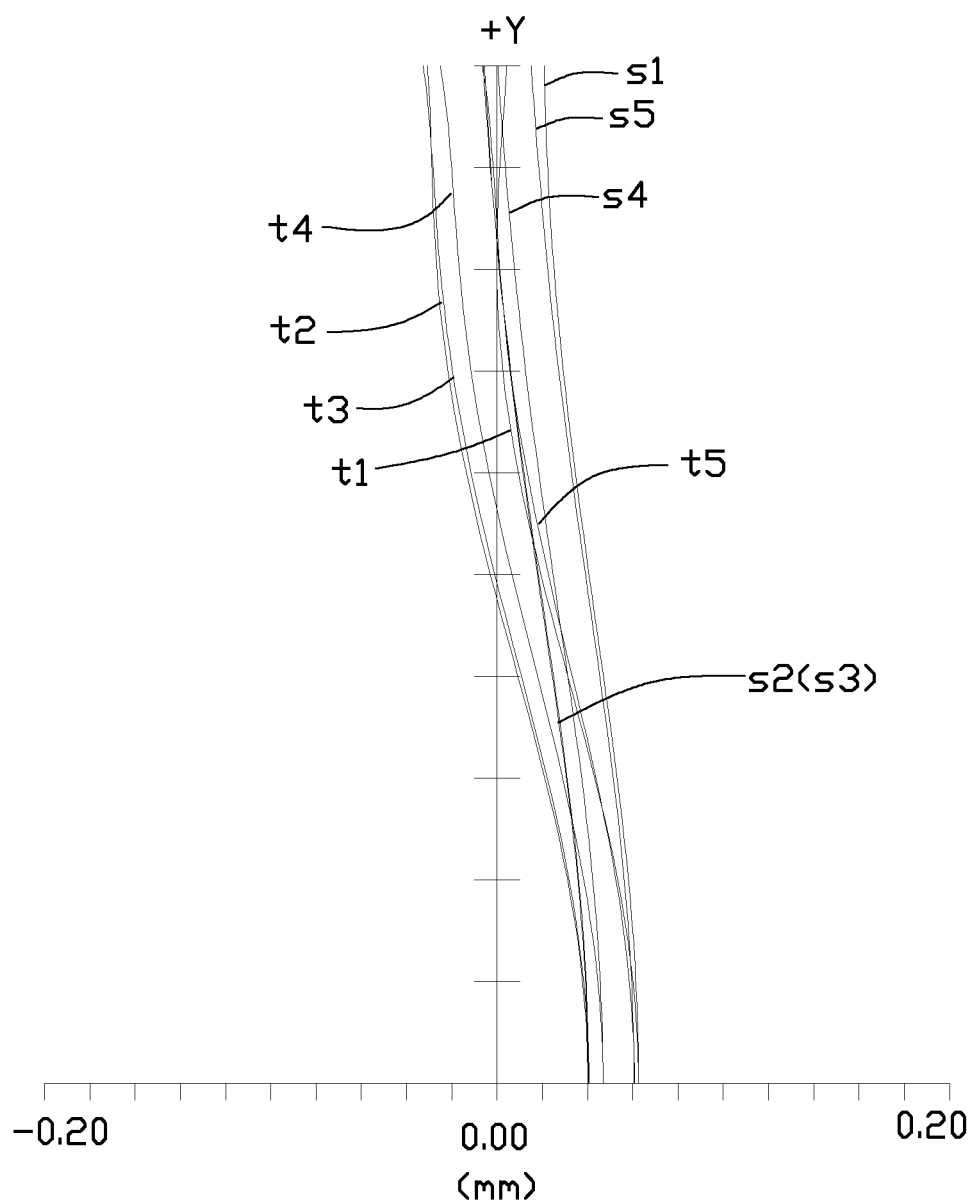
Figure 5:
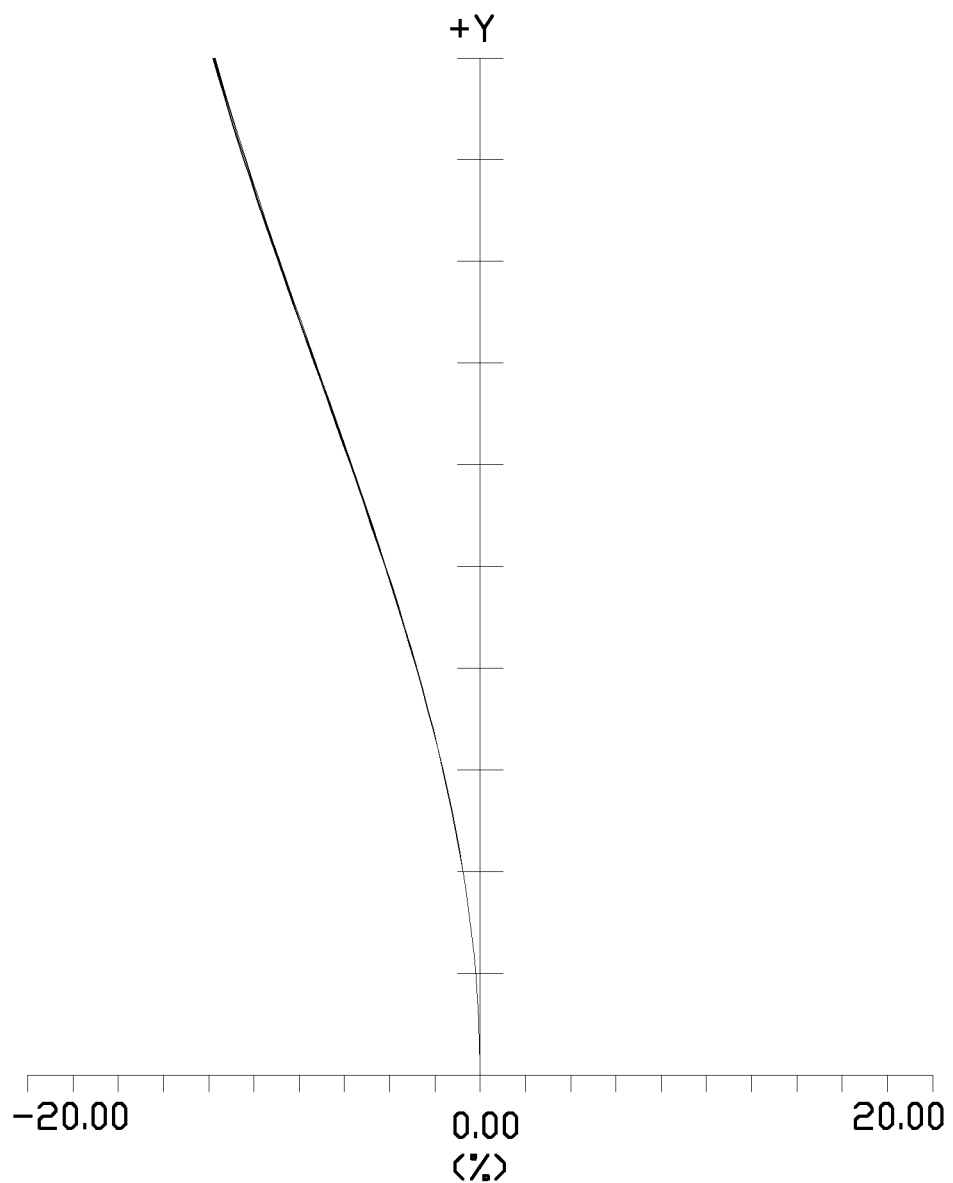

The spherical aberration graph, the field curvature graph, and the distortion graph of the zoom lens 10 in the wide angle state are respectively shown in FIGS. 3-5. In FIG. 3, a1-a5 are the field curvature curves of light with wavelength of 436 nanometers, 486 nanometers, 546 nanometers, 588 nanometers, and 656 nanometers respectively. In FIG. 4, t and s are the tangential field curvature curve and the sagittal field curvature curve respectively, t1-t5 are the tangential field curvature curves of light with wavelength of 436 nanometers, 486 nanometers, 546 nanometers, 588 nanometers, and 656 nanometers respectively, and s1-s5 are the sagittal field curvature curves of light with wavelength of 436 nanometers, 486 nanometers, 546 nanometers, 588 nanometers, and 656 nanometers respectively. Generally, spherical aberration of the zoom lens 10 is controlled within a range of −0.10 mm to 0.08 mm. The field curvature of the zoom lens 10 is kept within a range of −0.04 mm to 0.08 mm. The distortion of the zoom lens 10 falls within a range of −12% to 0%.

Figure 6:
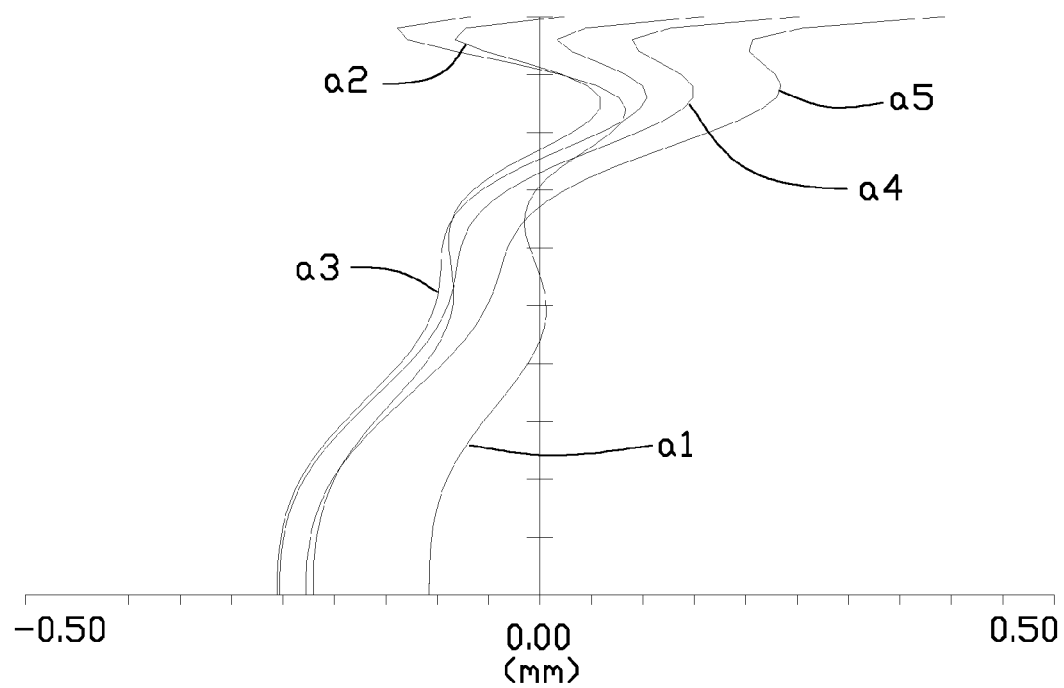
FIGS. 6-8 are graphs respectively showing spherical aberration, field curvature and distortion of the imaging device of FIG. 2.
Figure 7:
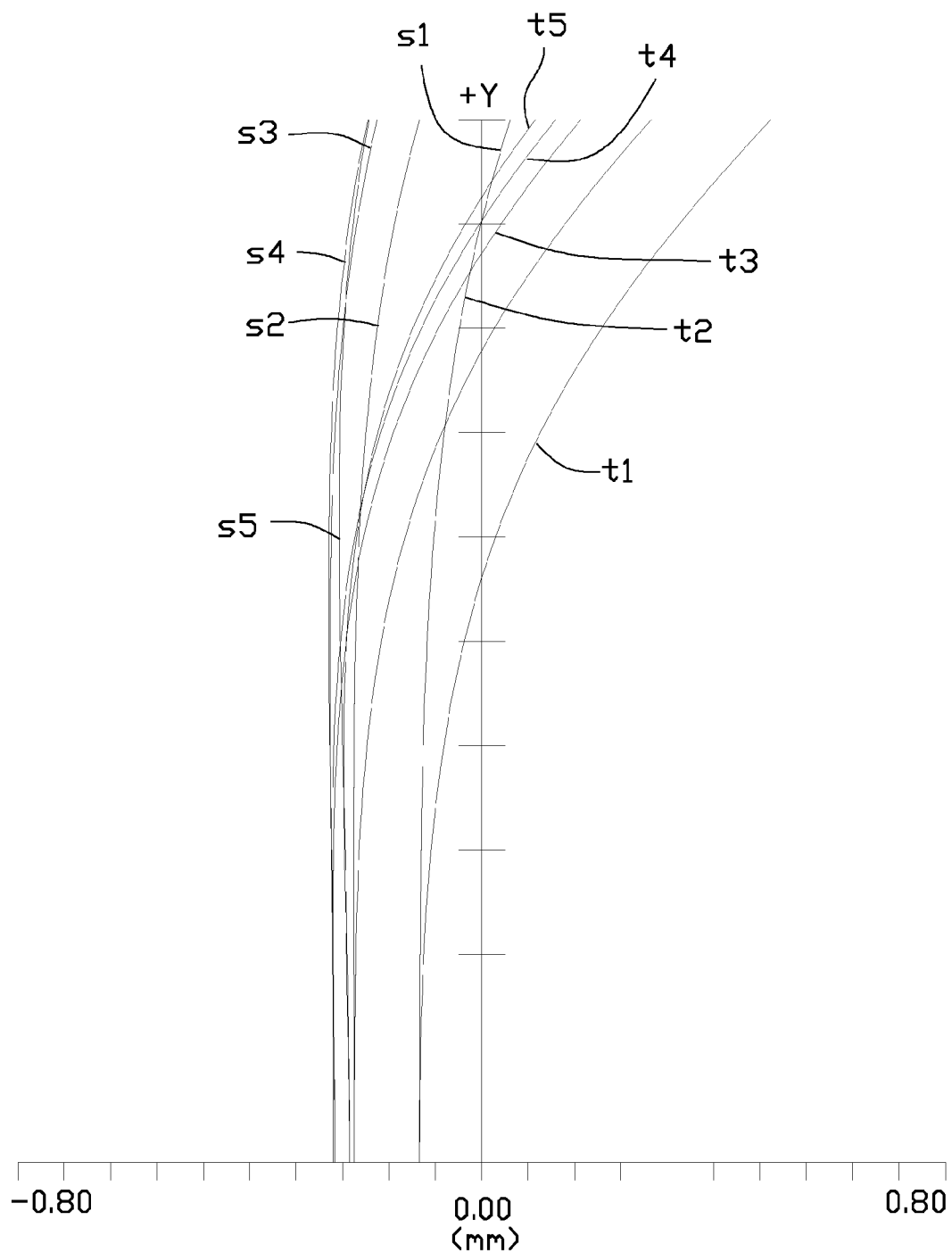
Figure 8:
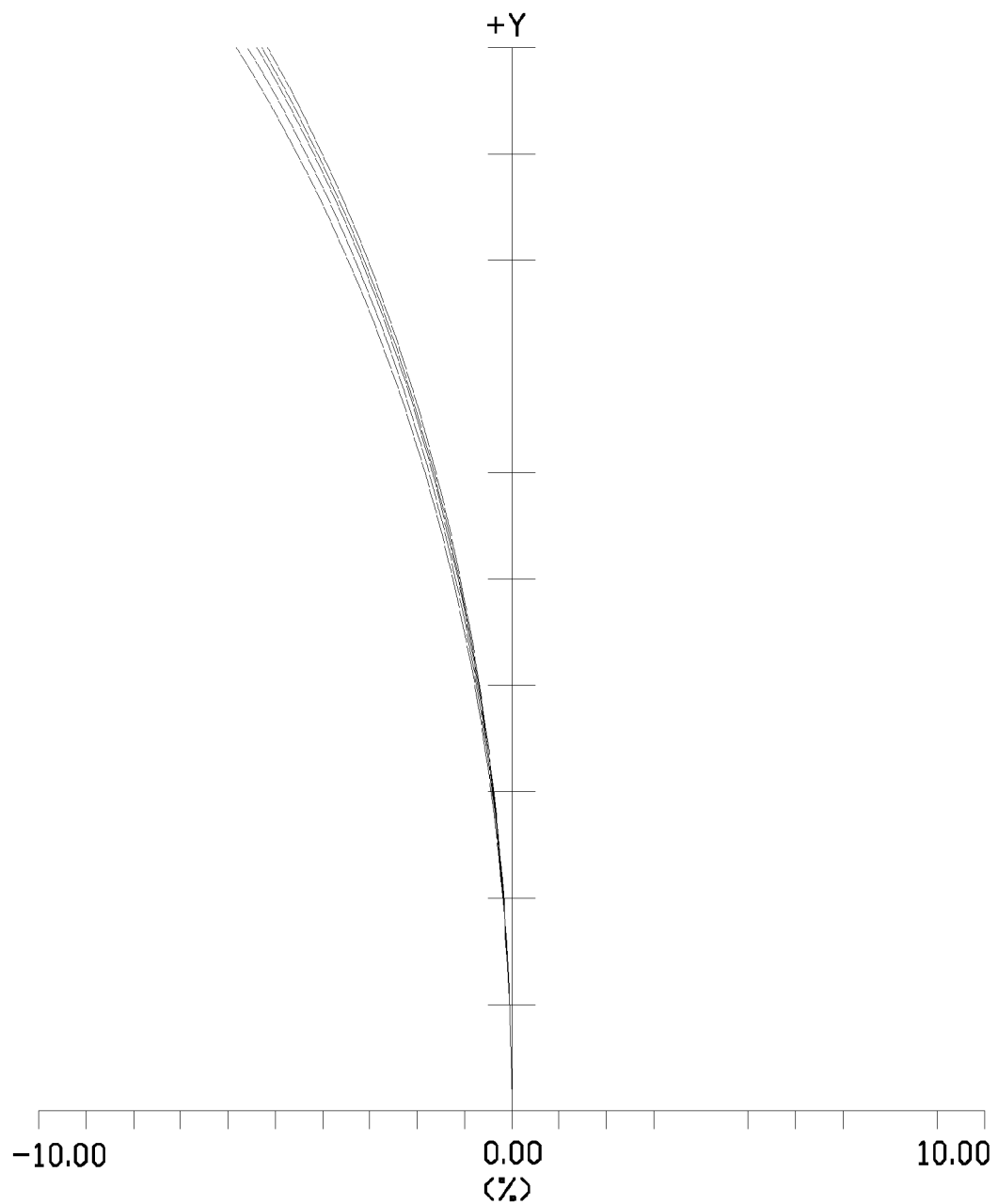

The spherical aberration graph, the field curvature graph, and the distortion graph of the zoom lens 10 in the telephoto state are respectively shown in FIGS. 6-8. Generally, spherical aberration of the zoom lens 10 is controlled within a range of −0.3 mm to 0.5 mm. The field curvature of the zoom lens 10 is kept within a range of −0.32 mm to 0.56 mm. The distortion of the zoom lens 10 falls within a range of −7% to 0%.

In the second exemplary embodiment, the zoom lens 10a satisfies the parameters of Tables 6-8. The symbols used in the Table 5-7 have the same meaning as in the first exemplary embodiment.

TABLE 6

| Surface | type | R (mm) | D (mm) | Nd | Vd |
|---|---|---|---|---|---|
| first surface | spherical | 15.90384 | 0.48 | 2.001003 | 29.134715 |
| second/third surface | spherical | 9.777388 | 2.955 | 1.804200 | 46.502535 |
| fourth surface | spherical | 46.94601 | D4 | — | — |
| fifth surface | spherical | 25.18727 | 0.4 | 1.883000 | 40.805404 |
| sixth surface | spherical | 4.086963 | 2 | — | — |
| seventh surface | spherical | −26.08895 | 0.35 | 1.729160 | 54.673513 |
| eighth surface | spherical | 15.03196 | 0.075 | — | — |
| ninth surface | spherical | 7.094077 | 1.062 | 2.002723 | 19.317191 |
| tenth surface | spherical | 14.75046 | D10 | — | — |
| aperture | — | infinity | 0.25 | — | — |
| eleventh surface | aspherical | 3.994934 | 1.242 | 1.693500 | 53.200779 |
| twelfth surface | aspherical | −218.5659 | 0.232 | — | — |
| thirteenth surface | spherical | 6.057806 | 0.845 | 1.922860 | 18.896912 |
| fourteenth surface | spherical | 3.250027 | 0.69 | — | — |
| fifteenth surface | spherical | 14.11827 | 0.62 | 1.496997 | 81.608379 |
| sixteenth surface | spherical | −39.91605 | D16 | — | — |
| seventeenth surface | aspherical | −17.63791 | 1.85 | 1.531131 | 55.753858 |
| eighteenth surface | aspherical | −8.030745 | D18 | — | — |
| filter | flat | infinity | 0.8 | 1.516 | 64.1 |
| imaging surface | flat | infinity | — | — | — |

TABLE 7

| state | f | D4 | D10 | D16 | D18 |
|---|---|---|---|---|---|
| wide-angle state | 4.59 | 0.4 | 9.194 | 3.144 | 3.74 |
| middle state | 18.32 | 10627 | 2.84 | 12.635 | 2 |
| telephoto state | 34.94 | 18.304 | 1.297 | 13.398 | 1.61 |

TABLE 8

| aspherical coefficient | eleventh surface | twelfth surface | seventeenth surface | eighteenth surface |
|---|---|---|---|---|
| k | 0.4224068 | 665.2078 | 0 | 0 |
| A4 | $-1.9103235 \times 10^{-4}$ | $3.4826645 \times 10^{-3}$ | $1.2500546 \times 10^{-3}$ | $1.9397925 \times 10^{-3}$ |
| A6 | $-8.8052476 \times 10^{-5}$ | $3.2837747 \times 10^{-4}$ | $1.9121893 \times 10^{-4}$ | $1.4044656 \times 10^{-4}$ |
| A8 | $2.232613 \times 10^{-4}$ | $-3.0253524 \times 10^{-4}$ | $-1.3631872 \times 10^{-5}$ | $-3.2052117 \times 10^{-6}$ |
| A10 | $-5.5652128 \times 10^{-5}$ | 0.00032280731 | $3.715308 \times 10^{-7}$ | $-7.2218202 \times 10^{-7}$ |
| A12 | $4.080371 \times 10^{-6}$ | $-1.077947 \times 10^{-4}$ | $8.0259183 \times 10^{-9}$ | $8.7218075 \times 10^{-8}$ |
| A14 | $1.3592509 \times 10^{-6}$ | $1.5561491 \times 10^{-5}$ | $1.1934615 \times 10^{-10}$ | $-2.9079321 \times 10^{-9}$ |
| A16 | $-1.3754611 \times 10^{-7}$ | $-5.0671169 \times 10^{-7}$ | $-4.0113779 \times 10^{-11}$ | $-7.8706165 \times 10^{-12}$ |

Obviously, the spherical aberration, field curvature, and distortion are well controlled in the zoom lens 10 although the zoom lens 10 is compact.

Figure 9:
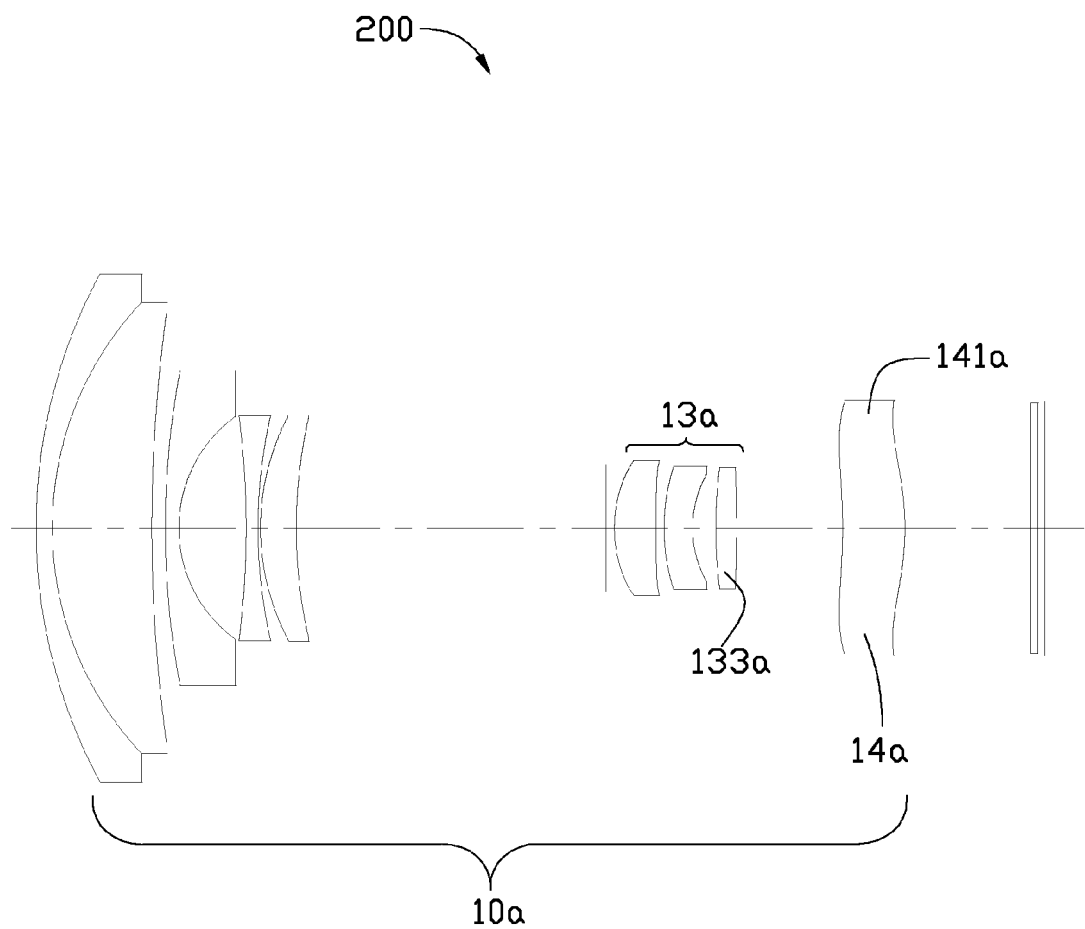
FIG. 9 is a schematic view of an imaging device at a wide angle state in accordance with a second exemplary embodiment.
Figure 10:
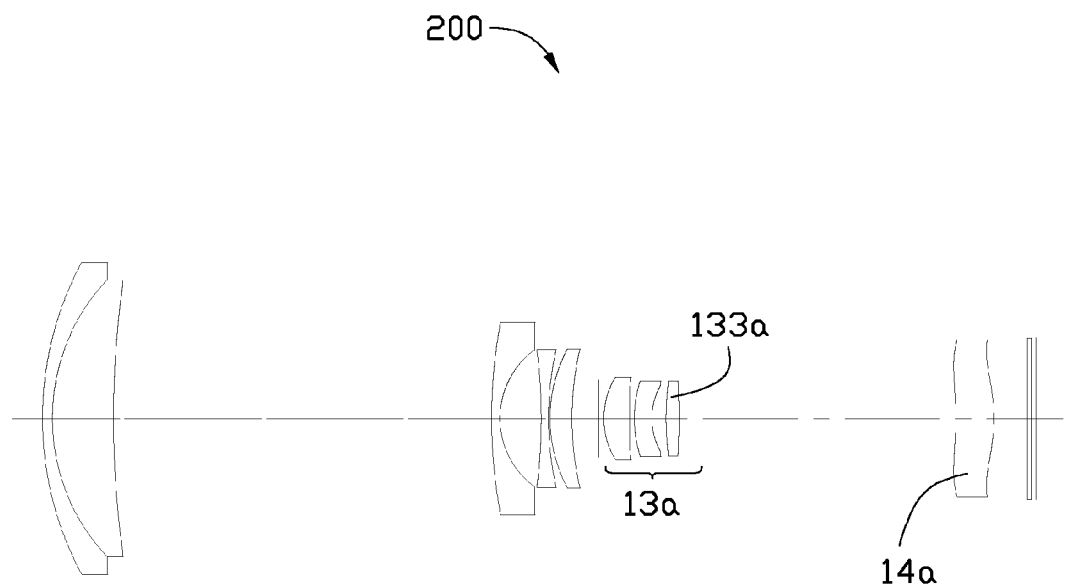
FIG. 10 is a schematic view of the imaging device of FIG. 9 at a telephoto state.

Referring to FIGS. 9-10, an imaging device 200 according to a second exemplary embodiment is shown. The difference between the imaging device 200 and the imaging device 100 of the first exemplary embodiment is: the eighth lens 133a of the third lens group 13a includes a convex fifteenth surface facing the object side, and the ninth lens 141a of the fourth lens group 14a is an aspherical lens.

In this embodiment, the zoom lens 10a also satisfies the formulas (1)-(4) in the first exemplary embodiment.

The aspherical surfaces are shaped according to the formula:

$$x = \frac{ch^2}{1 + \sqrt{1 - (k+1)c^2h^2}} + \sum A_i h^i$$

wherein h is a height from the optical axis of the zoom lens 10a to the aspherical surface, c is a vertex curvature, k is a conic constant, and Ai are i-th order correction coefficients of the aspherical surfaces.

In the second exemplary embodiment, the zoom lens 10a satisfies the parameters of Table 9. Listed below are the symbols used in Table 9: 2ω: field angle; $F_{No}$: F number.

TABLE 9

| state | $F_{No}$ | 2ω (degree) |
|---|---|---|
| wide-angle state | 3.1 | 86 |
| middle state | 5 | 24.26 |
| telephoto state | 5.5 | 13 |

From Tables 6 and Table 7, the parameters for formulas (1)-(4) are listed in Table 10 below.

TABLE 10

| parameter | L3 | Lt | f3 | ft | fw | V7 | V8 |
|---|---|---|---|---|---|---|---|
| value | 8.124 | 48.97 | 7.46 | 34.94 | 4.59 | 18.9 | 81.6 |

Therefore, the value of |L3|/Lt is about 0.166, the value of f3/(ft×fw) is about 0.047, the value of f3/ft is about 0.21, and the value of V7−V8 is about −62.7.

The zoom lens 10a has a zooming ratio of eight, and was tested using incident light at wavelengths of 436 nanometers, 486 nanometers, 546 nanometers, 588 nanometers, and 656 nanometers.

Figure 11:
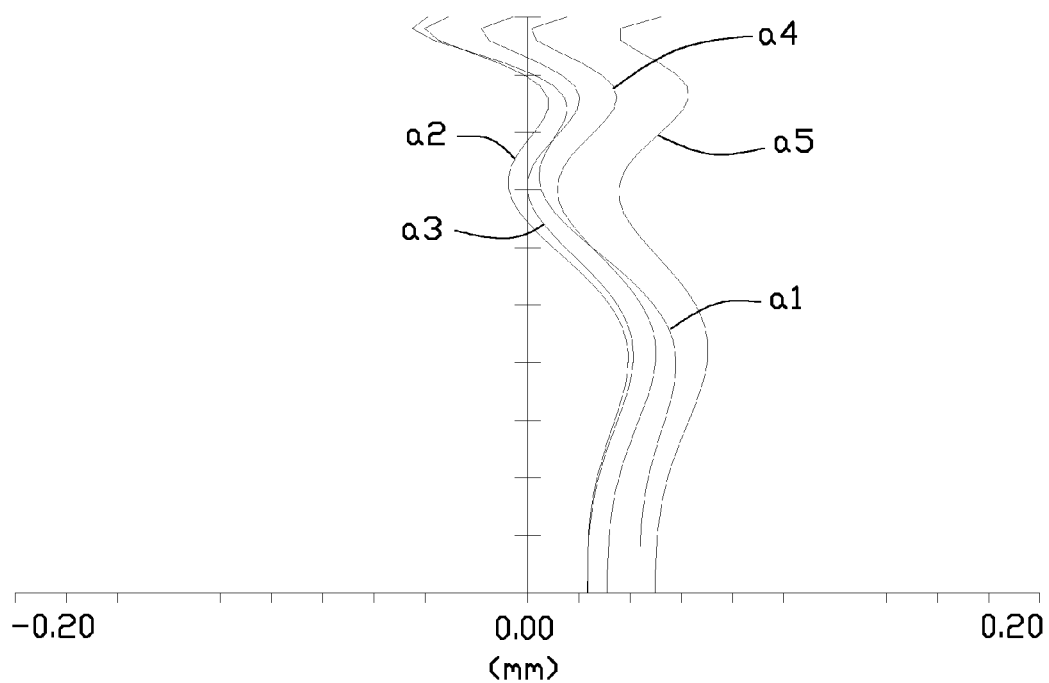
FIGS. 11-13 are graphs respectively showing spherical aberration, field curvature and distortion of the imaging device of FIG. 9.
Figure 12:
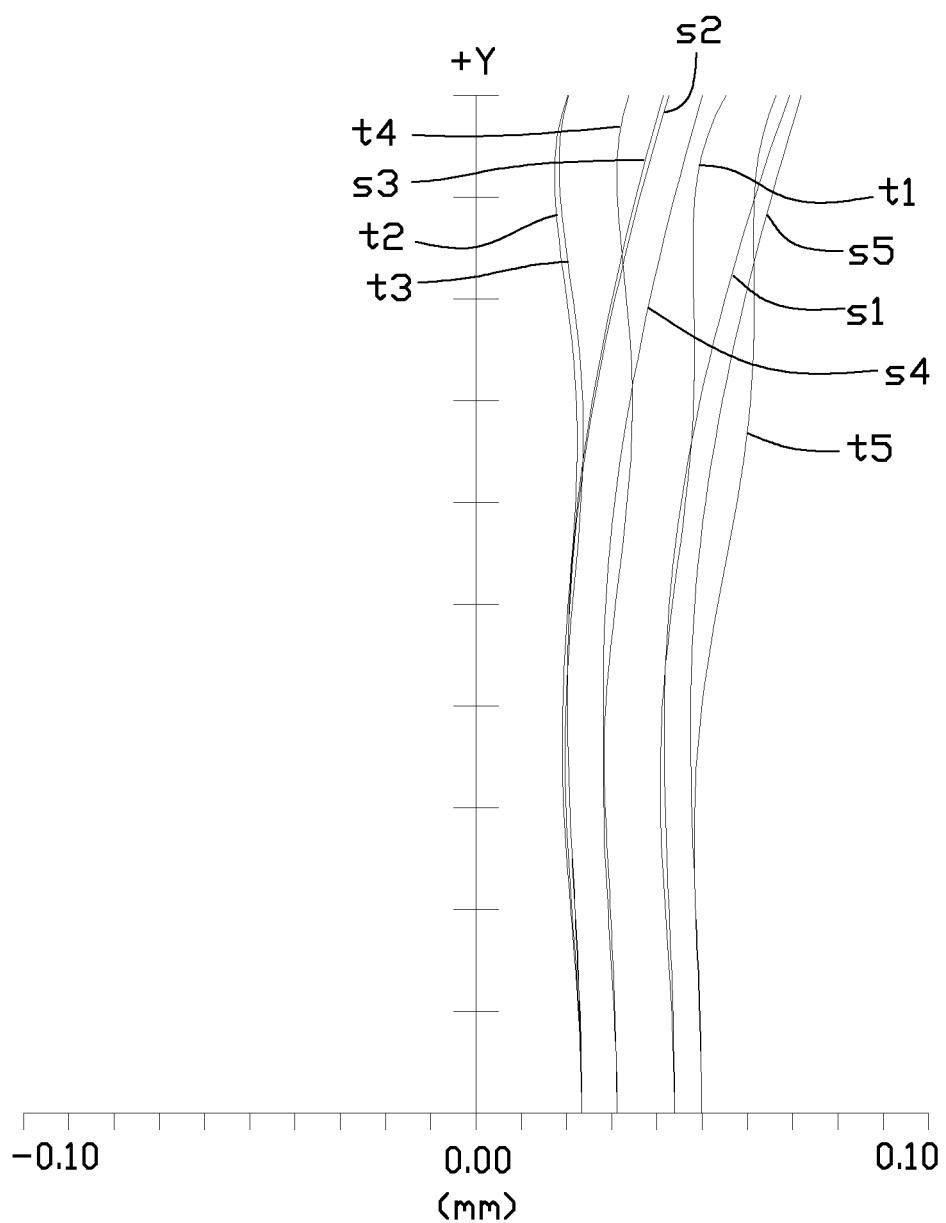
Figure 13:
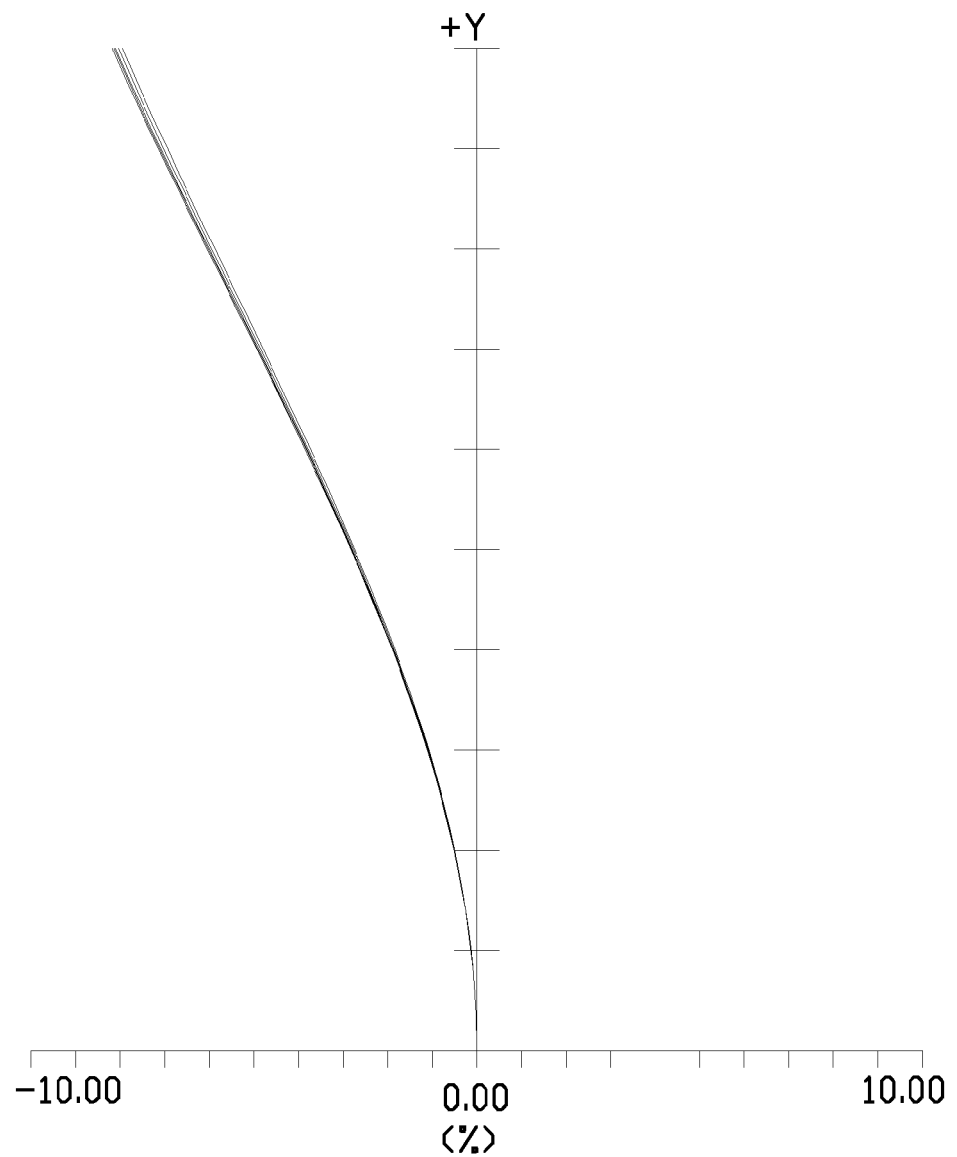

The spherical aberration graph, the field curvature graph, and the distortion graph of the zoom lens 10a in the wide angle state are respectively shown in FIGS. 11-13. Generally, spherical aberration of the zoom lens 10a is controlled within a range of −0.06 mm to 0.08 mm. The field curvature of the zoom lens 10a is kept within a range of 0.01 mm to 0.08 mm. The distortion of the zoom lens 10a falls within a range of −10% to 0%.

Figure 14:
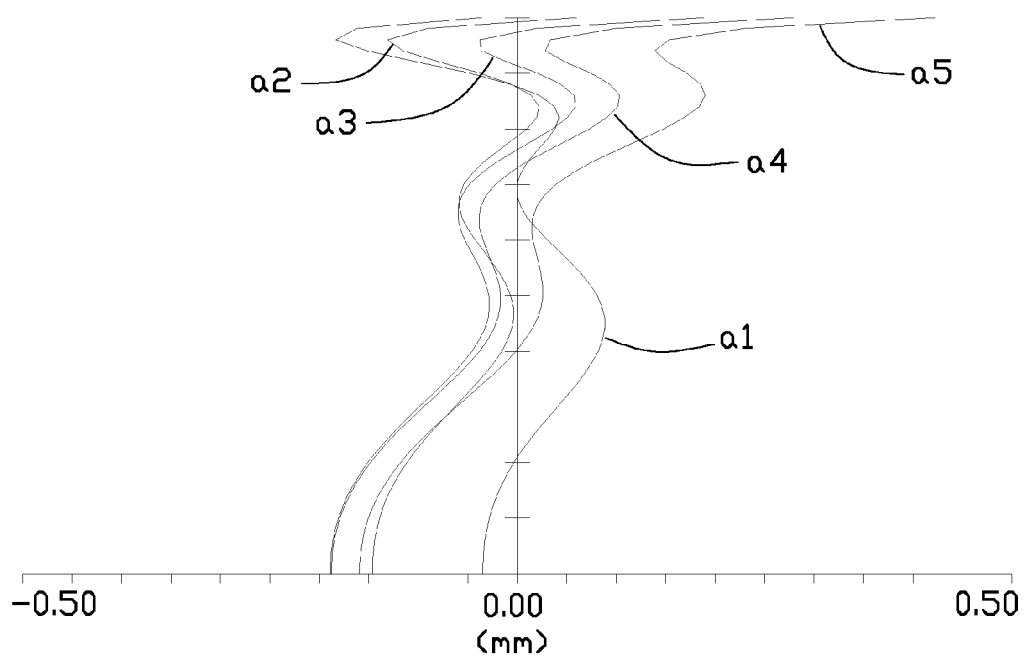
FIGS. 14-16 are graphs respectively showing spherical aberration, field curvature and distortion of the imaging device of FIG. 10.
Figure 15:
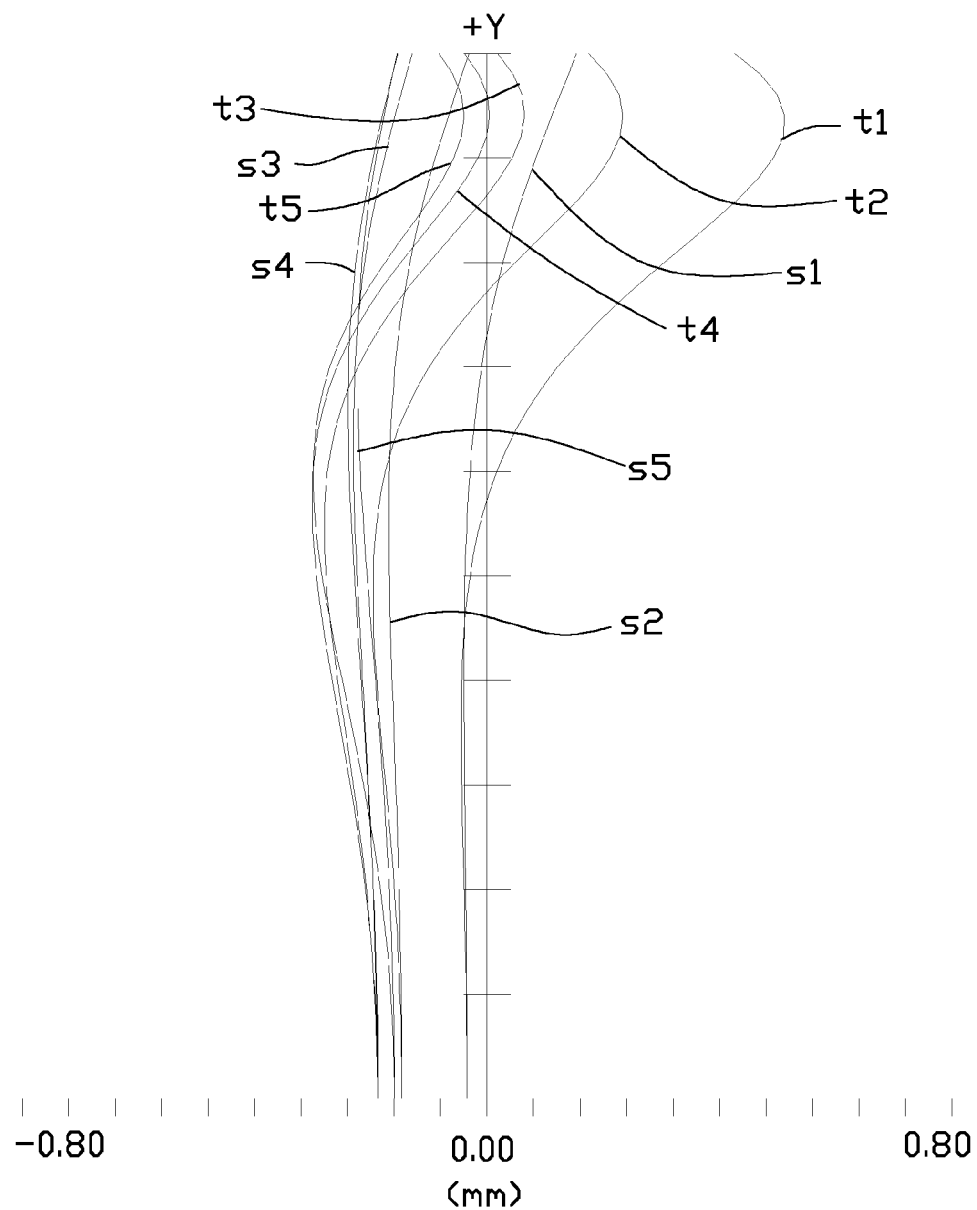
Figure 16:
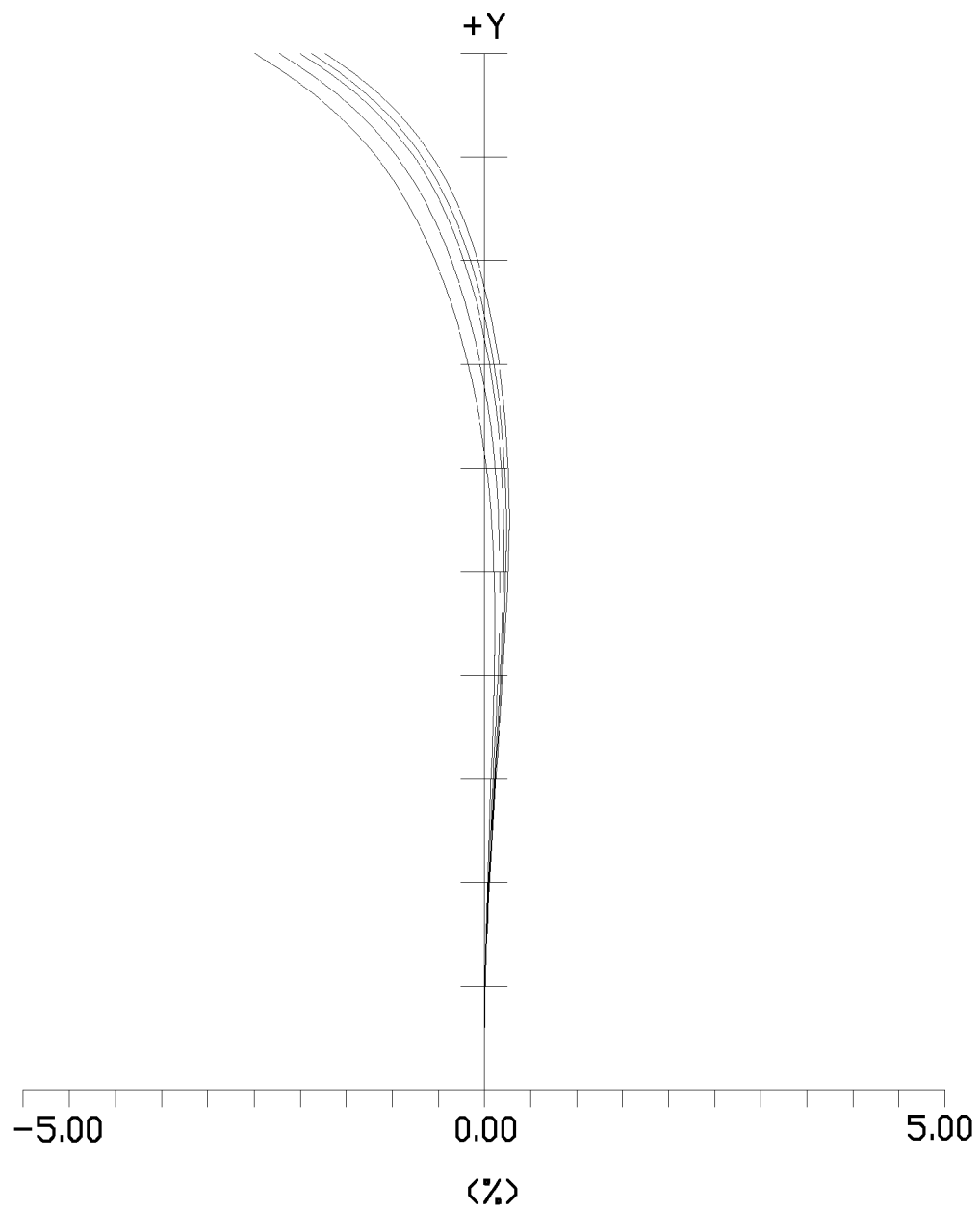

The spherical aberration graph, the field curvature graph, and the distortion graph of the zoom lens 10a in the telephoto state are respectively shown in FIGS. 14-16. Generally, spherical aberration of the zoom lens 10a is controlled within a range of −0.2 mm to 0.5 mm. The field curvature of the zoom lens 10a is kept within a range of −0.24 mm to 0.56 mm. The distortion of the zoom lens 10a falls within a range of −3% to 0%.

Obviously, the spherical aberration, field curvature, and distortion are well controlled in the zoom lens 10a although the zoom lens 10a is compact.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A zoom lens for imaging an object on an imaging surface, in the order from an object side to an image side thereof, comprising:
a first lens group with positive refraction power, the first lens group having a first surface facing the object side;
a second lens group with negative refraction power;
a third lens group with positive refraction power; and
a fourth lens group with positive refraction power;
wherein the zoom lens satisfies the formulas:

$$0.15<|L3|/Lt<0.25;$$

where L3 is a distance of the movement of the third lens group along an optical axis of the zoom lens when the zoom lens is switched between a wide-angle state and a telephoto state, and Lt is a distance from the first surface to the imaging surface.

2. The zoom lens as claimed in claim 1, wherein the zoom lens satisfies the formulas:

$$0.045<f3/(ft \times fw)<0.055;$$

wherein f3 an effective focal length of the third lens group, ft is an effective focal length of the zoom lens at the telephoto state, and fw is an effective focal length of the zoom lens at the wide-angle state.

3. The zoom lens as claimed in claim 2, wherein the zoom lens satisfies the formulas:

$$0.15<f3/ft<0.25.$$

4. The zoom lens as claimed in claim 1, wherein the first lens group comprises, in the order from the object side to the image side of the zoom lens, a first lens with negative refraction power and a second lens with positive refraction power, the first lens and the second lens are spherical lenses, the first lens comprises the first surface.

5. The zoom lens as claimed in claim 1, wherein the second lens group comprises, in the order from the object side to the image side of the zoom lens, a third lens with negative refraction power, a fourth lens with negative refraction power, and a fifth lens with positive refraction power.

6. The zoom lens as claimed in claim 1, wherein the third lens group comprises, in the order from the object side to the image side of the zoom lens, a sixth lens with positive refraction power, a seventh lens with negative refraction power, and an eighth lens with positive refraction power.

7. The zoom lens as claimed in claim 6, wherein the sixth lens is an aspherical lens, and the seventh lens and the eighth lens are spherical lenses.

8. The zoom lens as claimed in claim 6, wherein the zoom lens satisfies the formulas:

$$55<|V7-V8|<70;$$

wherein V7 is the Abbe number of the seventh lens, and V8 is the Abbe number of the eighth lens.

9. The zoom lens as claimed in claim 1, wherein the fourth lens group comprises a ninth lens with positive refraction power.

10. The zoom lens as claimed in claim 9, wherein the ninth lens is a spherical lens.

11. The zoom lens as claimed in claim 9, wherein the ninth lens is an aspherical lens.

12. An imaging device comprising:
a zoom lens, in the order from an object side to an image side thereof, comprising:
a first lens group with positive refraction power, the first lens group comprising a first surface facing the object side;
a second lens group with negative refraction power;
a third lens group with positive refraction power; and
a fourth lens group with positive refraction power; and
an image sensor aligned with an optical axis of the zoom lens, the image sensor comprising an imaging surface facing the object side;
wherein the zoom lens satisfies the formulas:

$$0.15<|L3|/Lt<0.25;$$

where L3 is a distance of the movement of the third lens group along the optical axis when the zoom lens is switched between a wide-angle state and a telephoto state, and Lt is a distance from the first surface to the imaging surface.

13. The imaging device as claimed in claim 12, wherein the zoom lens satisfies the formulas:

$$0.045 < f3/(ft \times fw) < 0.055;$$

wherein f3 an effective focal length of the third lens group, ft is an effective focal length of the zoom lens at the telephoto state, and fw is an effective focal length of the zoom lens at the wide-angle state.

14. The imaging device as claimed in claim 13, wherein the zoom lens satisfies the formulas:

$$0.15 < f3/ft < 0.25.$$

15. The imaging device as claimed in claim 12, wherein the first lens group comprises, in the order from the object side to the image side of the zoom lens, a first lens with negative refraction power and a second lens with positive refraction power, the first lens and the second lens are spherical lenses, the first lens comprises the first surface.

16. The imaging device as claimed in claim 12, wherein the second lens group comprises, in the order from the object side to the image side of the zoom lens, a third lens with negative refraction power, a fourth lens with negative refraction power, and a fifth lens with positive refraction power.

17. The imaging device as claimed in claim 12, wherein the third lens group comprises, in the order from the object side to the image side of the zoom lens, a sixth lens with positive refraction power, a seventh lens with negative refraction power, and an eighth lens with positive refraction power.

18. The imaging device as claimed in claim 17, wherein the sixth lens is an aspherical lens, and the seventh lens and the eighth lens are spherical lenses.

19. The imaging device as claimed in claim 17, wherein the zoom lens satisfies the formulas:

$$55 < |V7 - V8| < 70;$$

wherein V7 is the Abbe number of the seventh lens, and V8 is the Abbe number of the eighth lens.

20. The imaging device as claimed in claim 12, wherein the fourth lens group comprises a ninth lens with positive refraction power.

* * * * *